United States Patent [19]

Ishii et al.

[11] Patent Number: 4,925,561
[45] Date of Patent: May 15, 1990

[54] COMPOSITE PLANAR AND TRIANGULARLY PLEATED FILTER ELEMENT

[75] Inventors: Yoshio Ishii, Kawagoe; Shigeru Okaya, Fukaya, both of Japan

[73] Assignee: Tsuchiya Mfg. Co., Ltd., Tokyo, Japan

[21] Appl. No.: 330,464

[22] Filed: Mar. 30, 1989

[30] Foreign Application Priority Data

Mar. 31, 1988 [JP] Japan .............................. 63-41864[U]
Apr. 28, 1988 [JP] Japan .............................. 63-56541[U]
Apr. 28, 1988 [JP] Japan .............................. 63-56543[U]

[51] Int. Cl.5 .............................................. B01D 46/02
[52] U.S. Cl. ............................. 210/493.3; 210/493.5; 55/497; 55/499; 55/500; 55/511; 55/514; 55/521; 55/DIG. 12
[58] Field of Search ............... 210/493.1, 493.3, 493.5; 55/497, 498, 499, 500, 511, 514, 521, 483, 484, DIG. 12

[56] References Cited

U.S. PATENT DOCUMENTS

| | | | |
|---|---|---|---|
| 3,025,964 | 3/1962 | Summers et al. | 210/493.5 |
| 3,112,264 | 11/1963 | Bub | 210/493.5 |
| 4,056,375 | 11/1977 | Ringel et al. | 55/483 |
| 4,080,185 | 3/1978 | Richter et al. | 55/483 |
| 4,356,011 | 10/1982 | Day et al. | 55/483 |
| 4,452,619 | 6/1984 | Wright et al. | 210/493.5 |
| 4,584,005 | 4/1986 | Allan et al. | 55/521 |
| 4,589,983 | 5/1986 | Wydevan | 210/493.3 |

FOREIGN PATENT DOCUMENTS

| | | | |
|---|---|---|---|
| 1916155 | 1/1970 | Fed. Rep. of Germany | 55/DIG. 12 |
| 62-132714 | 8/1987 | Japan . | |

*Primary Examiner*—W. Gary Jones
*Assistant Examiner*—Wanda L. Millard
*Attorney, Agent, or Firm*—Foley & Lardner, Schwartz, Jeffery, Schwaab, Mack, Blumenthal & Evans

[57] ABSTRACT

A filter element comprises at least two pleated filtering mediums and at least one roughly flat filtering medium interposed between the pleated filtering mediums. Each pleated filtering medium has an end constituted by edges of triangular bottom sections and the other end constituted by edges of triangular top sections. The triangular bottom sections of one pleated filtering medium is bonded to the flat filtering medium only at and near the edges of the bottom sections. The triangular top sections of the other pleated filtering medium is bonded to the roughly flat filtering medium only at and near the edges of the top sections. Spacers are provided between the top sections and the flat filtering medium and between the bottom sections and the roughly flat filtering medium. Such spacers may be constituted by alternate small ridges and grooves formed in the roughly flat filtering medium.

19 Claims, 7 Drawing Sheets

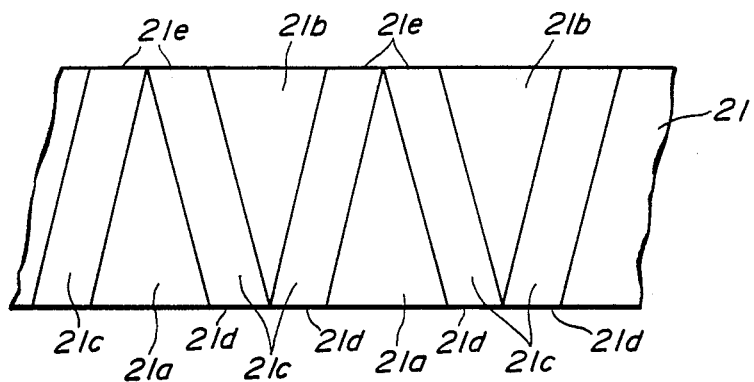
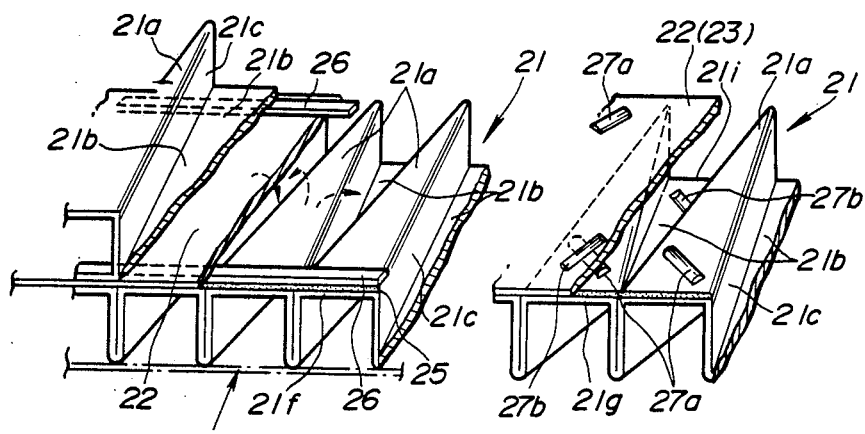

COMPOSITE PLANAR AND TRIANGULARLY PLEATED FILTER ELEMENT

BACKGROUND OF THE INVENTION

I. Field of the Invention

The present invention relates in general to fluid filters and more particularly to a filter element having a filtering medium which is pleated or folded to give a large filtering area in a relatively small space.

II. Description of the Prior Art

It is known to form a filtering medium from a filtering material which is folded to include alternating top and bottom sections of generally triangular shape, the top sections tapering in one direction and the bottom sections tapering in the opposite direction, and side wall sections lying between the top and bottom sections and having their edges joined in the front and back at the apexes of the triangular top and bottom sections.

A filter element having a pleated filtering medium of the above described kind is disclosed in Japanese Provisional Utility Model Publication No. 62-132714 and also shown in FIGS. 13 and 14.

In the prior art filter element of FIGS. 13 and 14, the bottom sections 12 are completely coated with adhesive and bonded to a roughly flat filtering medium 13. The bottom sections 12 therefore cannot effect a filtering action.

SUMMARY OF THE INVENTION

In accordance with the present invention, there is provided an improved filter element which comprises a roughly flat filtering medium formed of filtering material and a pleated filtering medium placed upon the roughly flat filtering medium. The pleated filtering medium is formed of filtering material folded to include alternate top and bottom sections of roughly triangular shape, the top sections tapering in one direction and the bottom sections tapering in the opposite direction, and side wall sections lying between the top and bottom sections and having their edges joined in the front and back at the apexes of the triangular top and bottom sections. The bottom sections have edges defining an end of the pleated filtering medium and joined by seal to the roughly flat filtering medium only at and near the edges of the bottom sections.

The filter element of the above construction is effective for overcoming the above noted shortcoming of the prior art filter element.

It is accordingly an object of the present invention to provide an improved filter element of the kind having a plurality of pleated filtering mediums which can efficiently increase the filtering area without accompaniment of a substantial increase of the flow resistance.

It is another object of the present invention to provide an improved filter element of the above described character which requires a smaller amount of sealant adhesive as compared with a comparable prior art filter element.

It is a further object of the present invention to provide an improved filter element of the above described character which is compact in size but has a large filtering area.

It is a further object of the present invention to provide an improved filter element of the above described character which can be formed from a number of relatively shallowly pleated filtering elements without accompaniment of substantial increase of flow resistance and thereby making it possible to increase the structural strength.

BRIEF DESCRIPTION OF THE DRAWINGS

FIG. 3 is a view similar to FIG. 14 but illustrates how a strip of filtering material is folded in forming a pleated filtering medium of the filter element of FIG. 1;

FIGS. 4 to 6 are enlarged fragmentary perspective views of filter elements according to modifications of the present invention;

DESCRIPTION OF THE PREFERRED EMBODIMENTS

Figure 1:
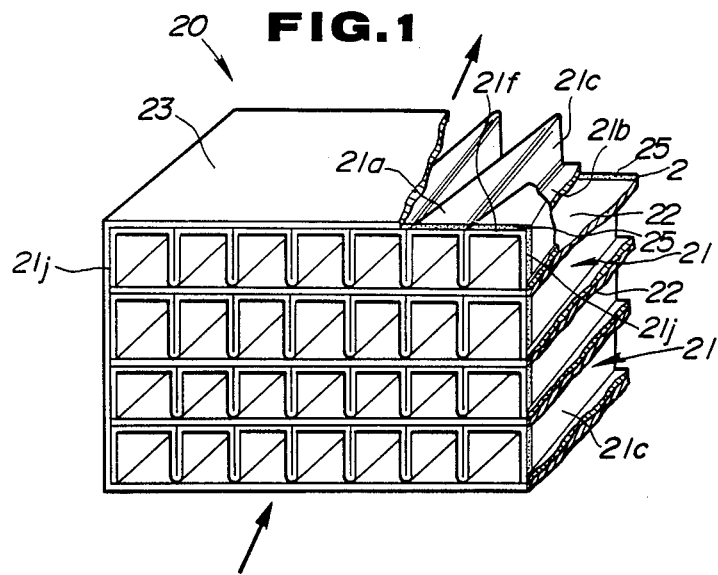
FIG. 1 is a perspective, partially cutaway view of a filter element according to an embodiment of the present invention.

Referring first to FIGS. 1 to 6, a filter element according to an embodiment of the present invention is generally indicated by 20 and consists of a plurality of pleated filtering mediums 21, a plurality of generally or roughly flat filtering mediums 22 each interposed between the adjacent two pleated filtering mediums 21 in such a way as to form a laminated or honeycomb-like construction and a casing 23 of filtering material or sythetic resinous material surrounding the subassembly of filtering mediums 21, 22 except for the front and back through which fluid enters and exits from the filter element 20, as indicated by the arrows in FIG. 1, when the filter element 20 is in use.

More specifically, the subassembly of filtering mediums 21, 22 has a rectangular configuration and is surrounded at four sides except for the front and back by the casing 23 which is correspondingly rectangular in shape.

Each pleated filtering medium 21 is formed from a strip of filtering material folded and corrugated as described above with the folds or bends lying substantially in the direction of fluid flow. That is, as seen from FIG. 2, each pleated filtering medium 21 has triangular top sections 21a, triangular bottom sections 21b and side walls 21c lying between the top and bottom sections 21a and 21b. Specifically, the top and bottom sections 21a, 21b are shaped so as to be of the same isoceles triangle.

The folding and bending of filtering medium 21 will be clearer from FIG. 3, where pairs of edges of the side walls 21c to be joined together and sealed to each other by sealant adhesive are shown at 21d for the front of the filter element 20 and at 21e for the back of the filter element 20.

The pleated filtering mediums 21 are placed one upon another, i.e., superposed in such a way that the top and bottom sections 21a, and 21b are respectively aligned with one another and equally spaced.

Each pleated filtering medium 21 has a generally or roughly straight front end 21f constituted by the front edges 21g of the top sections 21a, i.e., constituted by the bases 21g of the isosceles triangular top sections 21a, and a generally or roughly straight rear end 21h constituted by the rear edges 21i of the base sections 21b, i.e., constituted by the bases 21i of the isosceles triangular base sections 21b. Each pleated filtering medium 21 is bonded and sealed with sealant adhesive 25 only at and near the front and rear ends 21f, 21h to the adjacent upper and lower roughly flat filtering mediums 22. That is, the front end 21f and its adjacent portion of the pleated filtering medium 21 is bonded and sealed to the lower surface front end of the upper roughly flat filtering medium 22, whereas the rear end 21h and its adjacent portion is bonded and sealed to the upper surface rear end of the lower roughly flat filtering medium 22.

The front end 21f of each pleated filtering medium 21 further has a pair of vertically bent sections 21j constituted by the front edges of the side walls 21c located most outwards. In this connection, the most outward bottom sections 21b are halved so that the lateral and rear ends of each pleated filtering medium 21 are fittingly received in the rectangular casing 23, which will be described and shown in more detail with reference to the embodiment of FIGS. 7 and 8.

In the foregoing, it is to be noted that the bottom sections 21b are bonded and sealed to the roughly flat filtering medium 22 only at and near the rear edges 21i so that fluid can flow not only through the top and side wall sections 21a, 21c but through the bottom sections 21b when the fluid is filtrated by the filter element 20, i.e., the bottom sections 21b can effect a filtering action. Accordingly, the filter element 20 according to an embodiment of the present invention can give a larger filtering area and at the same time can reduce the flow resistance as compared with the comparable prior art filter element shown in FIGS. 13 and 14.

It is further to be noted that the top sections 21a are bonded and sealed only at and near the front edges 21g to the flat filtering medium 22 so that the top sections 21a can effect a filtering action even when a plurality of pleated filtering mediums 21 and a plurality of generally or roughly flat filtering mediums 22 are arranged in a multilayered fashion. Accordingly, the present invention makes it possible to increase the filtering area without accompaniment of a substantial increase of the flow resistance.

It is further to be noted that the present invention is effective for increasing the structrual strength of the filter element by forming a filter element including a number of relatively shallowly pleated filtering mediums. In this connection, if the prior art filter element is provided with a number of pleated filtering mediums, not only the filtering area in a limited space is considerably reduced but the flow resistance is considerably increased.

Figure 13:
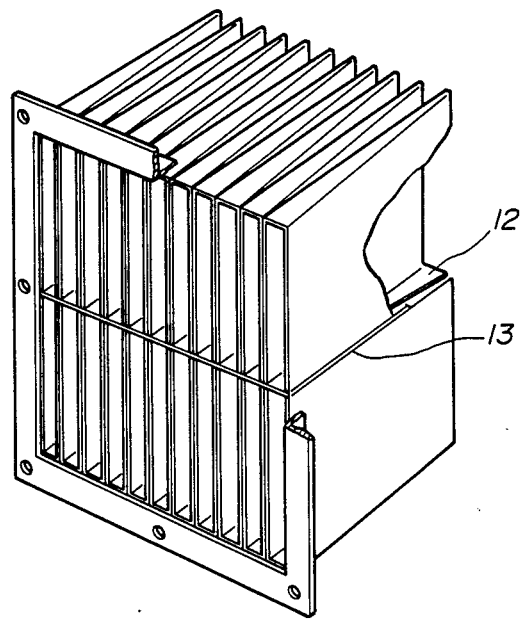
FIG. 13 is a perspective view of a prior art filter element.
Figure 14:
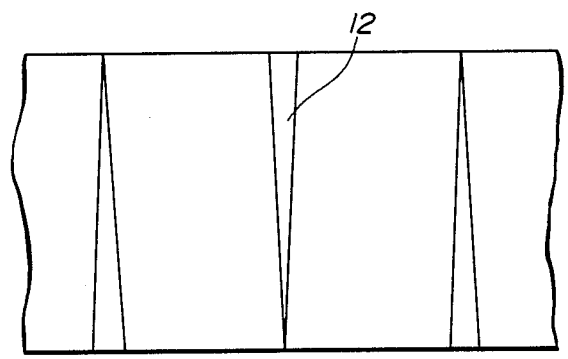
FIG. 14 illustrates how a strip of filtering material is bent in forming a pleated filtering medium of the filter element of FIG. 11.

It is further to be noted that the filter element 20 according to an embodiment of the present invention requires a smaller amount of sealant adhesive 25 as compared with the comparable prior art filter element shown in FIGS. 13 and 14 since the pleated filtering mediums 21 are bonded and sealed only at and near the front and rear ends 21f, 21h to the adjacent upper and lower roughly flat filtering mediums 22.

Referring to FIG. 4, a spacer in the form of a strip of tape indicated by 26 is disposed between the top sections 21a of each pleated filtering medium 21 and the adjacent roughly flat filtering medium 22 so that the top sections 21a are held out of contact with the roughly flat filtering medium 22, i.e., a space is defined between the top sections 21a and the adjacent roughly flat filtering medium 22. Similarly, another spacer 26 is disposed between the bottom sections 21b of each pleated filtering medium 21 and the adjacent roughly flat filtering medium 22 so that the bottom sections 21b are held out of contact with the filtering medium 22, i.e., a space is defined beween the bottom sections 21b and the adjacent roughly flat filtering medium 22. More specifically, the spacers 26 are disposed adjacent to the front edges 21g of the top sections 21a and the rear edges 21i of the bottom sections 21b. The spacers 26 are effective for enabling the top and bottom sections 21a, and 21b of each pleated filtering medium 21 to effect an efficient filtering action.

As shown in FIG. 5, a pair of projections 27a, and 27b may be formed in each top section 21a and its adjacent roughly flat filtering medium 22 in place of the spacers 26 of FIG. 4. Similarly, another pair of projections 27a, and 27b may be formed in each bottom section 21b and its adjacent roughly flat filtering medium 22. More specifically, each top section 21a may have near the front edge 21g the upward projection 27a which is put into contact with the downward projection 27b formed in the adjacent roughly flat filtering medium 22. Similarly, each bottom section 21b may have near the rear edge 21i the downward projection 27b which is put into contact with the upward projection 27a formed in the adjacent roughly flat filtering medium 22.

Figure 6:
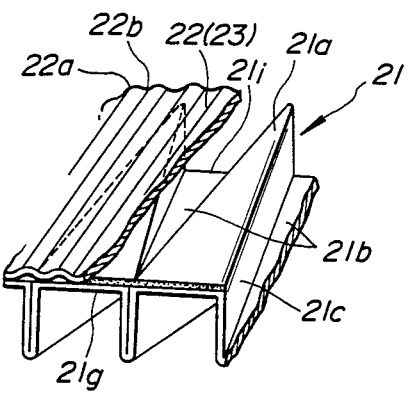

As shown in FIG. 6, the roughly flat filtering medium 22 may be formed with alternate small ridges 22a and grooves 22b in place of being formed with such projections 27a, and 27b or in place of being provided with such spacers 26. In other words, a spacer means is constituted by the small ridges 22a and grooves 22b formed in the roughly flat filtering medium 22. Such alternate small ridges 22a and grooves 22b may also be formed in the casing 23 for the same end.

Figure 7:
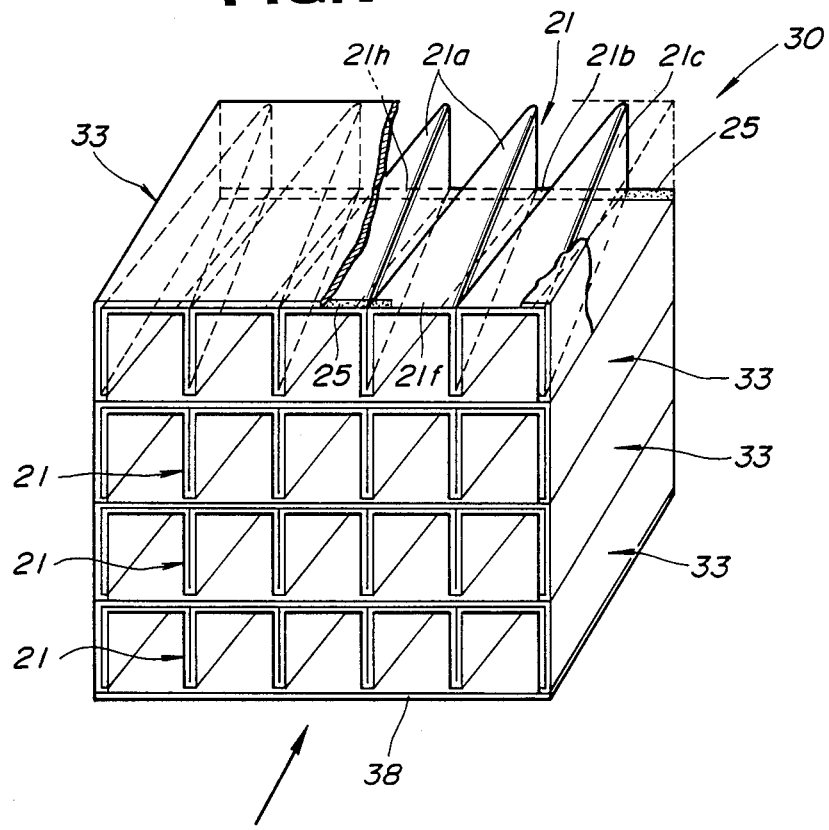
FIG. 7 is a view similar to FIG. 1 but shows another embodiment of the present invention.
Figure 8:
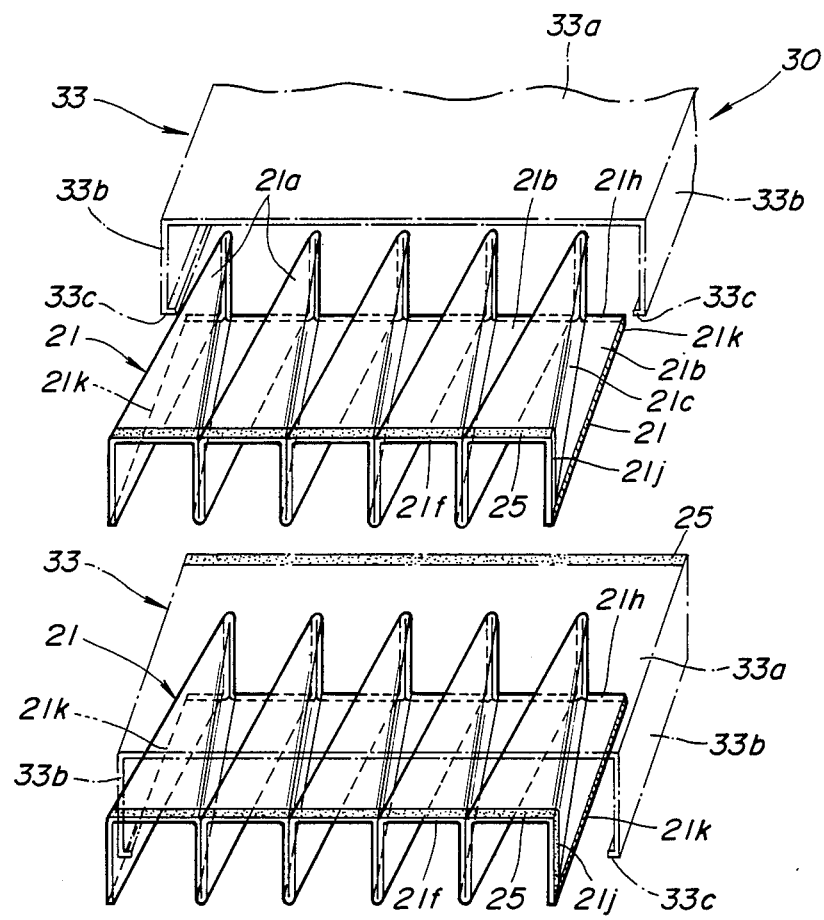
FIG. 8 is a fragmentary exploded view of the filter element of FIG. 7.

FIGS. 7 and 8 show another embodiment in which parts and portions similar to the previous embodiment of FIGS. 1 to 6 are designated by the same reference characters. As described with reference to the previous embodiment, the front end 21f of each pleated filtering medium 21 has the vertically bent sections 21j constituted by the front edges of the side walls 21c located most outwards. In this connection, as seen from FIG. 7, the most outward bottom sections 21c are halved so that each pleated filtering medium 21 has a predetermined rectangular plane figure or configuration, i.e. the pleated filtering medium 21 has lateral ends 21k which constitute together with the front and rear ends 21f, 21h a predetermined rectangular plane figure.

Each pleated filtering medium 21 is surrounded by a channel-shaped filtering medium 33 formed of filtering material except for the front, back and bottom. The channel-shaped filtering medium 33 consists of a top wall section 33a covering the top of each pleated filtering medium 21 and a pair of side wall sections 33b covering the opposite lateral ends of each filtering medium 21. The side wall sections 33b have at the lower ends thereof inwardly bent ends 33c. The top wall section 33a is bonded and sealed to the front end 21f of the pleated filtering medium 21 similar to the previous embodiment. The vertical bent sections 21j of the front end 21f, i.e., the front edges 21j of the most outward side wall sections 21c and the lateral ends 21k are bonded and sealed to the side wall sections 33b and the inwardly bent ends 33c with sealant adhesive 25.

The subassemblies of pleated filtering mediums 21 and channel-shaped filtering mediums 33 are placed one upon another and joined in such a manner that the rear end 21h of the pleated filtering medium 21 of one subassembly is bonded and sealed with sealant adhesive 25 to the top wall section 33a of the cover 33 of another subassembly. By the repetition of the above procedure, a filter element 30 of a predetermined laminated structure is obtained. The bottom of the lowest subassembly of pleated filtering medium 21 and channel-shaped filtering medium 33 is covered by a generally or roughly flat filtering material 38 formed of filtering material. That is, the rear end 21h of the pleated filtering medium 21 of the lowest subassembly is bonded and sealed with sealant adhesive 25 to the flat filtering medium 38. The roughly flat filtering medium 38 is also bonded and sealed to the inwardly bent ends 33c of the channel-shaped filtering medium 33 of the lowest subassembly.

In the foregoing, it will be understood that the channel-shaped filtering medium 33 of one of the most outward subassemblies, the side wall sections 33b of the remaining channel-shaped filtering mediums 33 and the roughly flat filtering medium 38 constitute a casing means similar to the casing 23 of the previous embodiment of FIGS. 1 to 6.

It will be further understood that the top wall sections 33a of the channel-shaped filtering mediums 33 except that of the highest subassembly serve as a partition means similar to the roughly flat filtering mediums 22 of the previous embodiment of FIGS. 1 to 6.

Except for the above, this embodiment is substantially similar to the previous embodiment and can produce substantially the same effect. Futhermore, this embodiment can make the assembly of the filter element 30 easy and efficient.

Figure 2:
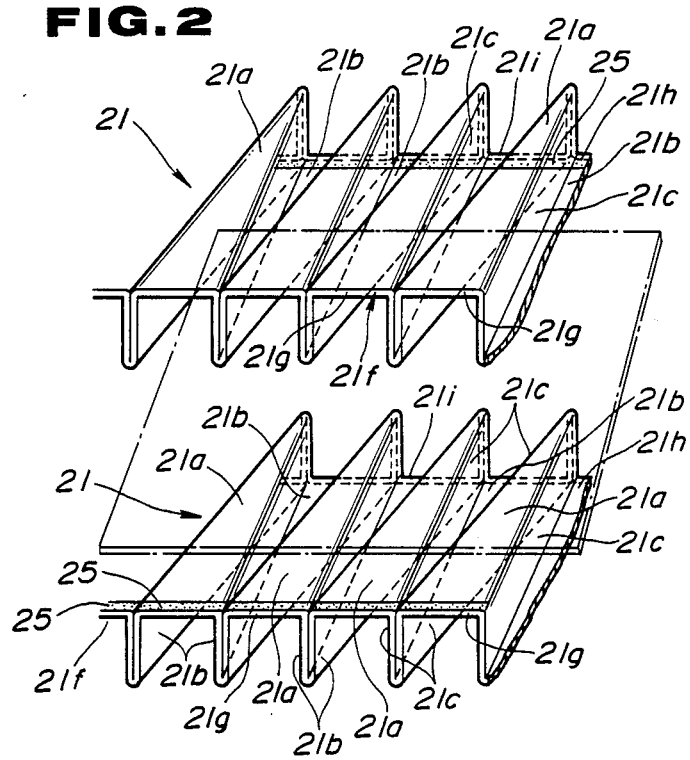
FIG. 2 is an enlarged fragmentary exploded view of the filter element of FIG. 1.
Figure 9:
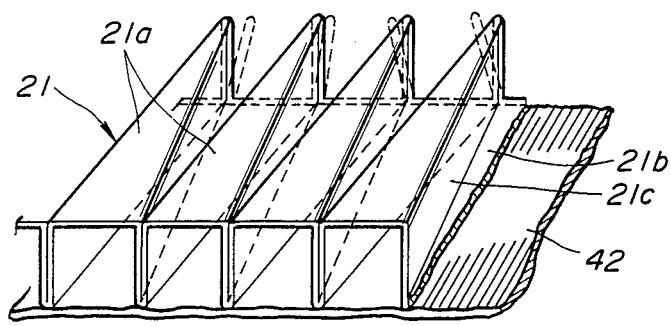
FIG. 9 is a fragmentary perspective view of a subassembly of pleated filtering medium and roughly flat filtering medium according to a further embodiment of the present invention.
Figure 10:
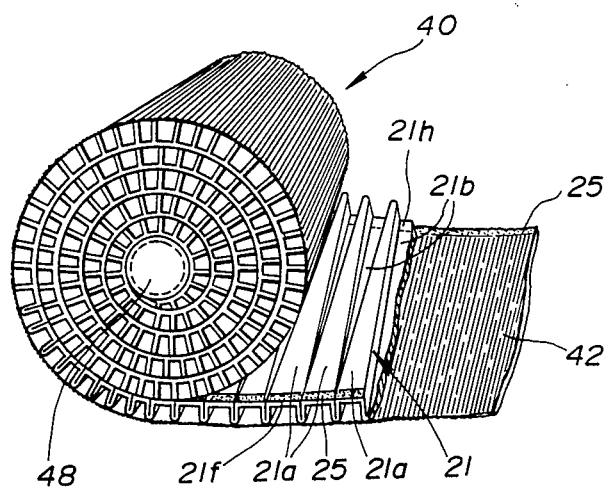
FIG. 10 illustrates how the of FIG. 9 is rolled into a filter element of a frustoconical shape.
Figure 11:
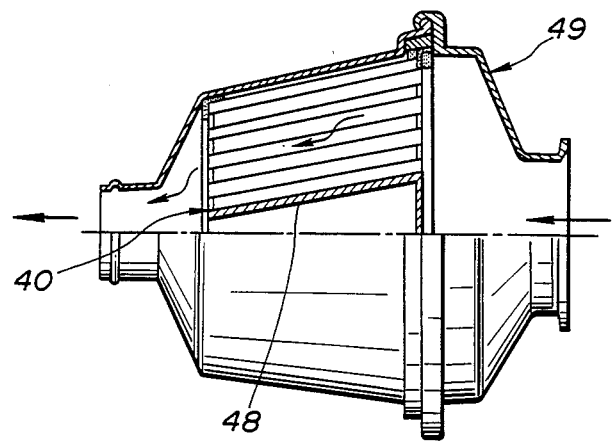
FIG. 11 is a partly sectional view of the filter element of FIG. 10 installed in a filter housing.

FIGS. 9 to 11 show a further embodiment in which parts and portions similar to the previous embodiment of FIGS. 1 to 3 are designated by the same reference characters. In this embodiment, an originally roughly or generally flat filtering medium 42 is formed from a filtering material corrugated so as to have alternate small ridges and grooves (no numeral). The rear end 21h of the pleated filtering medium 21 is bonded and sealed with sealant adhesive 25 to the originally roughly flat filtering medium 42 in a similar manner to the previous embodiments. As shown in FIG. 10, the subassembly of originally roughly flat filtering medium 42 and pleated filtering medium 21 is coiled or wound about a center pipe 48 and formed into a round shape while at the same time the front end 21f of the pleated filtering medium 21 is bonded with sealant adhesive 25 to the originally roughly flat filtering medium 21 in a similar manner to the previous embodiments.

Figure 12:
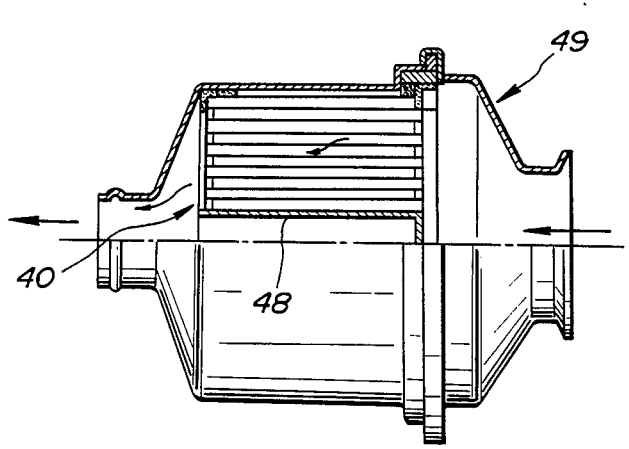
FIG. 12 is a view similar to FIG. 11 but shows a modification of the present invention.

More specifically, by the above coiling or winding, the subassembly of originally roughly flat filtering medium 42 and pleated filtering medium 21 are formed into a frustoconical shape. This is because the circumferential length of the subassembly does not substantially change at the front but reduces at the rear due to the fact that the apexes of the top sections 21a are caused to come nearer by the coiling. In this instance, by the effect of the small ridges and grooves, the originally roughly flat filtering medium 42 expands a little at the front and contracts at the rear, whereby to make it possible to attain the rolling of the unit of filtering mediums 21, 42 with ease. The tendency of being formed into the frustoconical shape can be reduced by bonding the top and bottom sections 21a, 21b together at the additional places. In use, the frustoconical filter element 40 is disposed in a filter housing 49 as shown in FIG. 11. In the meantime, by using a suitable jig or the like means, the subassembly of originally roughly flat filtering medium 42 and pleated filtering medium 21 can be wound into a cylindrical shape for installation in a cylindrical casing 49 as shown in FIG. 12.

Except for the above, this embodiment is substantially similar to the previous embodiment of FIGS. 1 to 6 and can produce substantially the same effect. This embodiment is further advantageous since the small ridges and grooves of the originally roughly flat filtering medium 42 can serve as spacers for defining spaces between the top and bottom sections 21a, 21b.

In the foregoing, it is to be noted that the terms "top", "bottom", "side", "vertically", "upper", "lower", "lowest" and so forth are to be understood in this connection as conveniently indicating relative positions only and not that the element necessarily lies in any particular plane.

What is claimed is:

1. A filter element comprising:
    a roughly flat filtering medium formed of filtering material; and
    a pleated filtering medium placed upon said roughly flat filtering medium;
    said pleated filtering medium being formed of a filtering material folded to include alternate top and bottom sections of roughly triangular shape, the top sections tapering in one direction and the bottom sections tapering in the opposite direction, and side wall sections lying between the top and bottom sections and having their edges joined in the front and back at the apexes of the triangular top and bottom sections;
    said bottom sections having edges defining an end of said pleated filtering medium and joined and sealed to said roughly flat filtering medium only at and near said edges of said bottom sections.

2. A filter element comprising:
    at least two pleated filtering mediums; and
    at least one roughly flat filtering medium formed of filtering material and interposed between said pleated filtering mediums;
    each pleated filtering medium being formed of filtering material folded to include alternate top and bottom sections of roughly triangular shape, the top sections tapering in one direction and the bottom sections tapering in the opposite direction, and side wall sections lying between the top and bottom sections and having their edges joined in the front and back at the apexes of the triangular top and bottom section;
    said bottom sections of each pleated filtering medium having edges defining an end of each pleated filtering medium;
    one of said pleated filtering mediums having said bottom sections which are bonded and sealed to said roughly flat filtering medium only at and near said edges of said bottom sections;

said top sections of each pleated filtering medium having edges defining the other end of each pleated filtering medium;

the other of said pleated filtering mediums having said top sections which are bonded and sealed to said roughly flat filtering medium only at and near said edges of said top sections.

3. The filter element according to claim 2, further comprising spacer means for spacing said top sections and said bottom sections away from said roughly flat filtering medium.

4. The filter element according to claim 3 wherein said spacer means between said bottom sections and said roughly flat filtering medium is located near said edges of said bottom sections and said spacer means between said top sections and said roughly flat filtering medium is located near said edges of said top sections.

5. The filter element according to claim 3 wherein said spacer means comprises alternate small ridges and grooves formed in said roughly flat filtering medium.

6. The filter element according to claim 2 further comprising casing means for surronding said pleated filtering mediums and said roughly flat filtering medium except for the front and back thereof, said one pleated filtering medium having said top sections which are bonded and sealed to said casing means only at and near said edges of said top sections, said other pleated filtering medium having said bottom sections which are bonded and sealed to said casing means only at and near said edges of said bottom sections.

7. A filter element comprising:
a plurality of pleated filtering mediums; and
a plurality of roughly flat filtering mediums formed of filtering material and each interposed between adjacent two pleated filtering mediums to constitute a roughly rectangular subassembly;
each pleated filtering medium being formed of filtering material folded to include alternate top and bottom sections of roughly triangular shape, the top sections tapering in one direction and the bottom sections tapering in the opposite direction, and side wall sections lying between the top and bottom sections and having their edges joined in the front and back at the apexes of the triangular top and bottom section;
said bottom sections of each pleated filtering medium having edges defining an end of each pleated filtering medium;
one of said adjacent two pleated filtering mediums having said bottom sections which are bonded and sealed to one roughly flat filtering medium only at and near said edges of said bottom sections;
said top sections of each pleated filtering medium having edges defining the other end of each pleated filtering medium;
the other of said adjacent two pleated filtering mediums having said top sections which are bonded and sealed to another roughly flat filtering medium only at and near said edges of said top sections; and
casing means for surrounding said subassembly except for the front and back thereof;
said one pleated filtering medium having said top sections which are bonded and sealed to said casing means only at said edges of said top sections, another pleated filtering medium having said bottom sections which are bonded and sealed to said casing means only at and near said edges of said bottom sections.

8. The filter element according to claim 7, wherein said other end of each pleated filtering medium is generally straight and further has a pair of bent sections constituted by the edges of the most outward two of said side wall sections, said edges of said most outward side wall section being bonded and sealed to said casing means.

9. The filter element according to claim 8, wherein said casing means comprises a hollow roughly rectangular casing, wherein the most outward two of said bottom sections of each pleated filtering medium is halved so that each pleated filtering medium has lateral ends which constitute together with said ends of each pleated filtering medium a predetermined rectangular plane figure and is fittingly received in said rectangular casing.

10. The filter element according to claim 9, further comprising spacer means for spacing said top sections and said bottom sections of said pleated filtering medium away from said adjacent roughly flat filtering mediums and said casing, respectively.

11. The filter element according to claim 10 wherein said spacer means comprises a strip of tape.

12. The filter element according to claim 11, wherein said spacer means comprises a plurality of projections formed in said top and bottom sections of each pleated filtering medium and said casing, respectively.

13. The filter element according to claim 7 wherein said casing means is roughly rectangular and comprises a channel-shaped filtering medium constituting a top wall and a portion of side walls, a roughly flat filtering medium constituting a bottom wall and a plurality of separate filtering mediums constituting said side walls of said casing means and joined together so as to constitute said casing means together with said channel-shaped filtering medium and said roughly flat filtering medium.

14. The filter element according to claim 13 wherein said separate filtering mediums are integrally formed with said roughly flat filtering mediums which are interposed between said adjacent two pleated filtering mediums and have the same shape as said channel-shaped filtering medium, respectively.

15. The filter element according to claim 14 wherein said separate filtering mediums and said channel-shaped filtering mediums have inwardly bent ends at which they are joined together.

16. The filter element according to claim 7 wherein said top and bottom sections of said one pleated filtering medium are respectively aligned with said top and bottom sections of said other pleated filtering medium.

17. A filter element comprising:
a plurality of pleated filtering mediums each formed of filtering material folded to include alternate top and bottom sections of roughly triangular shape, the top sections tapering in one direction and the bottom sections tapering in the opposite direction, and side wall sections lying between the top and bottom sections and having their edges joined in the front and back at the apexes of the triangular top and bottom section;
a plurality of roughly channel-shaped filtering mediums, covering said pleated filtering mediums except for the front, back and bottom, respectively;

said roughly channel-shaped filtering mediums and said pleated filtering mediums being joined together so as to constitute subassemblies;

said subassemblies being arranged so as to constitute a laminated construction; and a roughly flat filtering medium formed of filtering material and covering said bottom of one subassembly;

said roughly channel-shaped filtering medium of each subassembly being formed of filtering material and having a top wall section covering a top of said pleated filtering medium and a pair of side wall sections covering opposite lateral ends of said pleated filtering medium, said side wall sections having inwardly bent ends;

said top sections of each pleated filtering medium having edges defining an end of each pleated filtering medium;

said pleated filtering medium of each subasssembly having said top sections which are bonded and sealed to said top section of said roughly channel-shaped filtering medium of each subassembly only at and near said edges of said top sections;

said bottom sections of each pleated filtering medium having edges defining the other end of said pleated filtering medium;

said pleated filtering medium of said one subasssembly having said bottom sections which are bonded and sealed to said top sections of said roughly flat filtering medium of another subassembly only at and near said edges of said bottom sections;

said roughly channel-shaped filtering medium of said one subassembly being bonded and sealed at said bent ends to said top wall sections of said roughly flat filtering medium of said another subassembly;

said pleated filtering medium of another subassembly having said bottom sections which are bonded and sealed to said roughly flat filtering medium only at and near said edges of said bottom sections;

said side wall sections of said roughly channel-shaped filtering medium of said second mentioned another subassembly being bonded and sealed at said bent ends to roughly flat filtering medium.

18. A filter element comprising:

an originally roughly flat filtering medium formed of filtering material;

a pleated filtering medium placed upon said roughly flat filtering medium and joined to same to form a subasssembly; and a center pipe around which said subassembly is wound and thereby formed into a coiled shape;

said pleated filtering medium being formed of a filtering material folded to include alternate top and bottom sections of roughly triangular shape, the top sections tapering in one direction and the bottom sections tapering in the opposite direction, and side wall sections lying between the top and bottom sections and having their edges joined in the front and back at the apexes of the triangular top and bottom sections;

said bottom sections having edges defining an end of said pleated filtering medium and bonded and sealed to one side of said originally roughly flat filtering medium only at and near said edges of said bottom sections;

said top sections having edges defining the other end of said pleated filtering medium and bonded and sealed to the other side of said originally roughly flat filtering medium only at and near said edges of said top sections.

19. The filter element according to claim 18 wherein said originally roughly flat filtering medium is formed with alternate small ridges and grooves.

* * * * *